United States Patent
Sato

(10) Patent No.: US 11,279,180 B2
(45) Date of Patent: Mar. 22, 2022

(54) TIRE FOR A MOTORCYCLE

(71) Applicant: Sumitomo Rubber Industries, Ltd., Hyogo (JP)

(72) Inventor: Ryota Sato, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 194 days.

(21) Appl. No.: 16/237,892

(22) Filed: Jan. 2, 2019

(65) Prior Publication Data

US 2019/0232731 A1 Aug. 1, 2019

(30) Foreign Application Priority Data

Jan. 31, 2018 (JP) .............................. JP2018-015490

(51) Int. Cl.

| | |
|---|---|
| *B60C 3/00* | (2006.01) |
| *B60C 3/04* | (2006.01) |
| *B60C 15/00* | (2006.01) |
| *B60C 9/28* | (2006.01) |
| *B60C 9/02* | (2006.01) |
| *B60C 9/22* | (2006.01) |
| *B60C 11/03* | (2006.01) |
| *B60C 9/14* | (2006.01) |
| *B60C 11/00* | (2006.01) |

(Continued)

(52) U.S. Cl.
CPC ............ *B60C 15/0072* (2013.01); *B60C 3/04* (2013.01); *B60C 9/0292* (2013.01); *B60C 9/2204* (2013.01); *B60C 9/28* (2013.01); *B60C 11/0332* (2013.01); *B60C 15/0018* (2013.01); *B60C 15/0027* (2013.01); *B60C 5/08* (2013.01); *B60C 9/14* (2013.01); *B60C 11/0083* (2013.01); *B60C 2015/061* (2013.01); *B60C 2200/10* (2013.01)

(58) Field of Classification Search
CPC ......... B60C 2200/10; B60C 3/04; B60C 9/22; B60C 9/28; B60C 3/00
See application file for complete search history.

(56) References Cited

U.S. PATENT DOCUMENTS 4,802,520 A * 2/1989 Armellin .................. B60C 3/04
152/454

FOREIGN PATENT DOCUMENTS

| EP | 2 123 482 A1 | 11/2009 |
| EP | 2 127 904 A1 | 12/2009 |
| EP | 2 196 331 A1 | 6/2010 |

(Continued)

OTHER PUBLICATIONS

Machine translation of JP 2010-188780, 2010.*

(Continued)

*Primary Examiner* — Justin R Fischer
(74) *Attorney, Agent, or Firm* — Studebaker & Brackett PC

(57) ABSTRACT

When (I) a tyre 1 is in contact with a flat surface (S) with a camber angle θ of 40 degrees, (II) a load (F) applied to the tyre is increased from zero, and (III) a curve (T) is obtained by plotting, in a XY coordinate, a displacement (Δx) in a tyre axial direction and a displacement (Δy) in a tyre radial direction of a position (A) of one of tyre tread edges (Te) closer to the flat surface (S), the displacements being from a reference position (A0) when the load (F) is zero, inclination of the curve (T) increases as the load (F) increases at least in a range where the load (F) is not more than 78% of a maximum load capacity load of the tyre.

15 Claims, 5 Drawing Sheets

(51) Int. Cl.
 *B60C 5/08* (2006.01)
 *B60C 15/06* (2006.01)

(56) References Cited

FOREIGN PATENT DOCUMENTS

| | | | |
|---|---|---|---|
| JP | 3-273909 | * | 12/1991 |
| JP | H06-040210 A | | 2/1994 |
| JP | 2008-162433 A | | 7/2008 |
| JP | 2010-188780 | * | 9/2010 |
| JP | 2013-216135 A | | 10/2013 |
| JP | 2014-878 | * | 1/2014 |

OTHER PUBLICATIONS

Machine translation of JP 3-273909, 1991.*
The extended European search report issued by the European Patent Office dated May 8, 2019, which corresponds to European Patent Application No. 18213135.9-1012 and is related to U.S. Appl. No. 16/237,892.

* cited by examiner

TIRE FOR A MOTORCYCLE

TECHNICAL FIELD

The present invention relates to a tyre for a motorcycle having improved cornering performance.

BACKGROUND ART

In tyres for a motorcycle, one provided with a band layer of a so-called parallel structure in which band cords are spirally wound in a tyre circumferential direction outside a carcass is frequently used (see Japanese unexamined Patent Application Publication No. H06-040210, for example).

In the band layer having this parallel structure, restraining force in the tyre circumferential direction is strong. therefore, it is possible that deformation such as lifting of a tread portion is suppressed. Thereby, it is possible that high-speed running performance and high-speed durability are improved.

On the other hand, however, rigidity of the tread portion is greatly increased by the band layer, therefore, deflection amount (stroke amount) of the tread portion is insufficient during cornering. As a result, a ground contacting width and a ground contacting area are decreased, therefore, sliding (sliding in a lateral direction) is likely to occur, thereby, it is possible that controllability is bad.

SUMMARY OF THE INVENTION

An object of the present invention is to provide a tyre for a motorcycle capable of improving the cornering performance by suppressing occurrence of the sliding during cornering to improve the controllability.

In one aspect of the present invention, a tyre for a motorcycle comprises a carcass extending between bead cores of bead portions via a tread portion and sidewall portions, wherein when (I) the tyre mounted on a standard rim and inflated to a standard inner pressure is in contact with a flat surface with a camber angle of 40 degrees, (II) a load (F) applied to the tyre is increased from zero, and (III) a curve is obtained by plotting a displacement ($\Delta x$) in a tyre axial direction and a displacement ($\Delta y$) in a tyre radial direction of a position of one of tyre tread edges closer to the flat surface, the displacements being from a reference position when the load (F) is zero, inclination of the curve increases as the load (F) increases at least in a range where the load (F) is not more than 78% of a maximum load capacity load of the tyre.

In another aspect of the invention, it is preferred that when points obtained by plotting the displacements when the load (F) is 0%, 25%, 40%, 50%, 65%, and 78% of the maximum load capacity load are respectively defined as P0, P1, P2, P3, P4, and P5, an inclination K1 of a straight line connecting between the points P1 and P0 calculated as $(\Delta y1-\Delta y0)/(\Delta x1-\Delta x0)$, an inclination K2 of a straight line connecting between the points P2 and P1 calculated as $(\Delta y2-\Delta y1)/(\Delta x2-\Delta x1)$, an inclination K3 of a straight line connecting between the points P3 and P2 calculated as $(\Delta y3-\Delta y2)/(\Delta x3-\Delta x2)$, an inclination K4 of a straight line connecting between the points P4 and P3 calculated as $(\Delta y4-\Delta y3)/(\Delta x4-\Delta x2)$, and an inclination K5 of a straight line connecting between the points P5 and P4 calculated as $(\Delta y5-\Delta y4)/(\Delta x5-\Delta x3)$ satisfy a following expression (1):

$$K1<K2<K3<K4<K5 \tag{1}$$

In another aspect of the invention, it is preferred that the inclination K5 satisfies a following expression (2):

$$2 \times K4 < K5 < 100 \tag{2}$$

In another aspect of the invention, it is preferred that each of the bead portions is provided with a bead apex rubber extending in a tyre radial direction from a respective one of the bead cores, and a height (H1) in the tyre radial direction of each of the bead apex rubbers from a bead base line is in a range of from 0.70 to 1.40 times a height (H2) in the tyre radial direction of a rim flange of the standard rim from the bead base line.

In another aspect of the invention, it is preferred that a distance (Lj) in the tyre axial direction between each of maximum width positions (Q) of the carcass and a center of gravity point (G) of a respective one of the bead cores is in the range of from 0.50 to 0.85 times a distance (LJ) in the tyre axial direction between each of the tread edges (Te) and the respective center of gravity point (G).

In another aspect of the invention, at is preferred that the distance (Lj) between each of the maximum width positions (Q) and the respective center of gravity point (G) is in a range of from 0.65 to 0.80 times the distance (LJ) between each of the tread edges (Te) and the respective center of gravity point (G).

In another aspect of the invention, it is preferred that a height (Hj) in the tyre radial direction of the carcass between each of the maximum width positions (Q) and the bead base line is in a range of from 0.50 to 0.85 times a height (HJ) in the tyre radial direction between each of the tread edges and the bead base line.

In another aspect of the invention, it is preferred that the height (Hj) of the carcass is in a range of from 0.70 to 0.80 times the height (HJ) between each of the tread edges and the bead base line.

In another aspect of the invention, it is preferred that a band layer formed of a band cord spirally wound is arranged on an outer side in the tyre radial direction of the carcass and inside of the tread portion, and a width (Wb) in the tyre axial direction of the band layer is in a range of from 0.5 to 0.95 times a tread width (TW).

In the present invention, the "standard rim" is a wheel rim specified for the concerned tyre by a standard included in a standardization system on which the tyre is based, for example, the "normal wheel rim" in JATMA, "Design Rim" in TRA, and "measuring Rim" in ETRTO. The "standard inner pressure" is air pressure specified for the concerned tyre by a standard included in a standardization system on which the tyre is based, for example, the "maximum air pressure" in JATMA, maximum value listed in the "TIRE LOAD LIMITS AT VARIOUS COLD INFLATION PRESSURES" table in TRA, and "INFLATION PRESSURE" in ETRTO.

Further, the "maximum load capacity load" is a value of a maximum load capacity determined by the value of a load index (LI) displayed on the tyre. This maximum load capacity value is the maximum value of the load capacity determined for each value of the load index in the "air pressure-load capacity correspondence table" specified for the concerned tyre by a standard included in a standardization system on which the tyre is based. Further, the air pressure (maximum air pressure) corresponding to the value of the maximum load capacity corresponds to the standard inner pressure. Note that if the maximum load capacity is indicated on the tyre, follow this.

Unless otherwise noted, the dimensions and the like of the tyre 1 are those specified in a standard state in which the tyre is mounted on the standard rim and inflated to the standard inner pressure.

In the present invention, when the tyre is in contact with a flat surface with a camber angle of 40 degrees by being loaded with a load (F) in a direction perpendicular to the flat surface, when a position of one of tread edges closer to the flat surface is represented by a displacement ($\Delta$x) in a tyre axial direction and a displacement ($\Delta$y) in a tyre radial direction, inclination of a curve obtained from points (P) of various values of the load (F) each obtained by plotting the respective displacements ($\Delta$x) and ($\Delta$y) in the XY coordinate increases as the load (F) increases at least in a range where the load (F) is not ore than 78% of the maxi mum load capacity load.

In other words, when the load (F) is applied to this tyre with the camber angle of 40 degrees, deflection occurs in the tread portion, therefore, the positions of the tread edges move by the displacement ($\Delta$x) in the tyre axial direction and the displacement ($\Delta$y) in the tyre radial direction.

At this time, the slope of the curve obtained from the points (P) obtained by plotting the displacements ($\Delta$x) and ($\Delta$y) in the XY coordinates increases as the load (F) increases. This means that as the load (F) increases, the rate of the increase in the deflection amount of the tread portion in the tyre radial direction increases. That is, it is possible that the rate of the increase of the ground contacting width due to the increase of the load (F) is further increased. Thereby, occurrence of sudden sliding especially during cornering is suppressed, therefore, the controllability is improved, thereby, it is possible that the cornering performance is improved. Further, it is useful for improving brake performance.

DESCRIPTION OF THE PREFERRED EMBODIMENT

An embodiment of the present invention will now be described below in detail.

Figure 1:
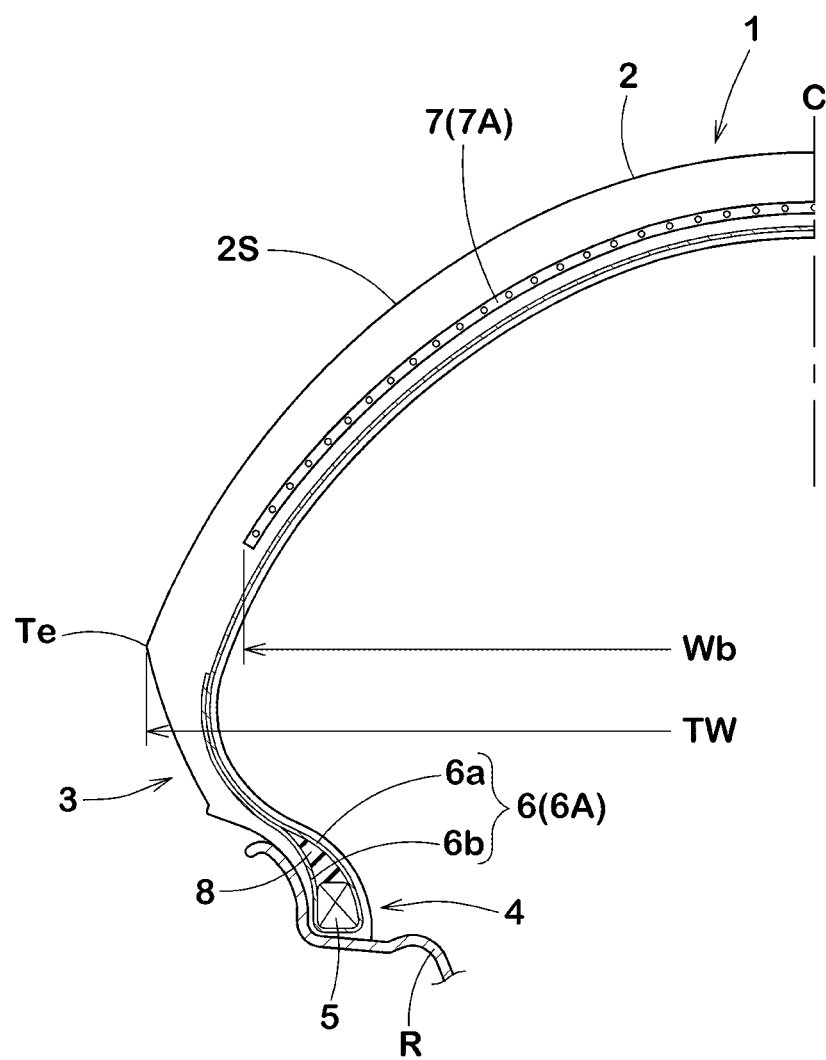
FIG. 1 is a cross-sectional view of a tyre for a motorcycle according to an embodiment of the present invention.

FIG. 1 is a cross-sectional view (left half) of a tyre 1 for a motorcycle in the standard state in which the tyre is mounted on a standard rim (R) and inflated to the standard inner pressure. As shown in FIG. 1, the tyre 1 for a motorcycle (hereinafter may be referred to as "tyre 1") in this embodiment is provided with a carcass 6 extending between bead cores 5 of bead portions 4 via the tread portion 2 and sidewall portions 3, and a band layer 7 arranged on an outer side in the tyre radial direction of this carcass 6 and inside of the tread portion 2. In this embodiment, a case where the tyre 1 is configured as a tyre for a rear wheel is shown.

The tread portion 2 has an outer surface (2S) curved in a convex arc shape between the tread edges (Te) via a tyre equator (C). A tread width (TW) which is a distance in the tyre axial direction between the tread edges (Te) is a maximum width of the tyre, therefore, cornering running peculiar to a motorcycle in which a vehicle body is greatly tilted is made possible.

The carcass 6 is formed by at least one, one in this embodiment, carcass ply (6A) in which carcass cords are arranged at an angle in a range of from 60 to 90 degrees with respect to the tyre circumferential direction. The carcass ply (6A) is provided with a ply main body portion (6a) extending between the bead cores 5 and a pair of ply turned up portions (6b) arranged at both ends of the ply main body portion (6a) and each turned up around a respective one of the bead cores 5 from inside to outside in the tyre axial direction. It is preferred that each of the ply turned up portions (6b) terminates on an inner side in the tyre radial direction of a respective one of the tread edges (Te).

Each of the bead portions 4 is provided with a bead apex rubber 8. Each of the bead apex rubbers 8 extends in a tapered manner and outwardly in the tyre radial direction from a respective one of the bead cores 5 passing through between the ply main body portion (6a) and a respective one of the ply turned up portions (6b). The bead apex rubbers 8 are formed of a hard rubber having a rubber hardness not less than 60, for example. The rubber hardness is hardness measured by a type-A durometer under an environment of 23 degrees Celsius in accordance with Japanese Industrial standard JIS-K6253.

The band layer 7 is formed of at least one, one in this embodiment, band ply 7A. This band ply 7A has a jointless structure in which band cords are spirally wound in the tyre circumferential direction.

For the band cords and the carcass cords, cords made of an organic fiber such as nylon, polyester, rayon, and aromatic polyamide can be suitably used, for example. Further, for the band cords, in addition to those listed above, steel cords can also be used.

Figure 3:
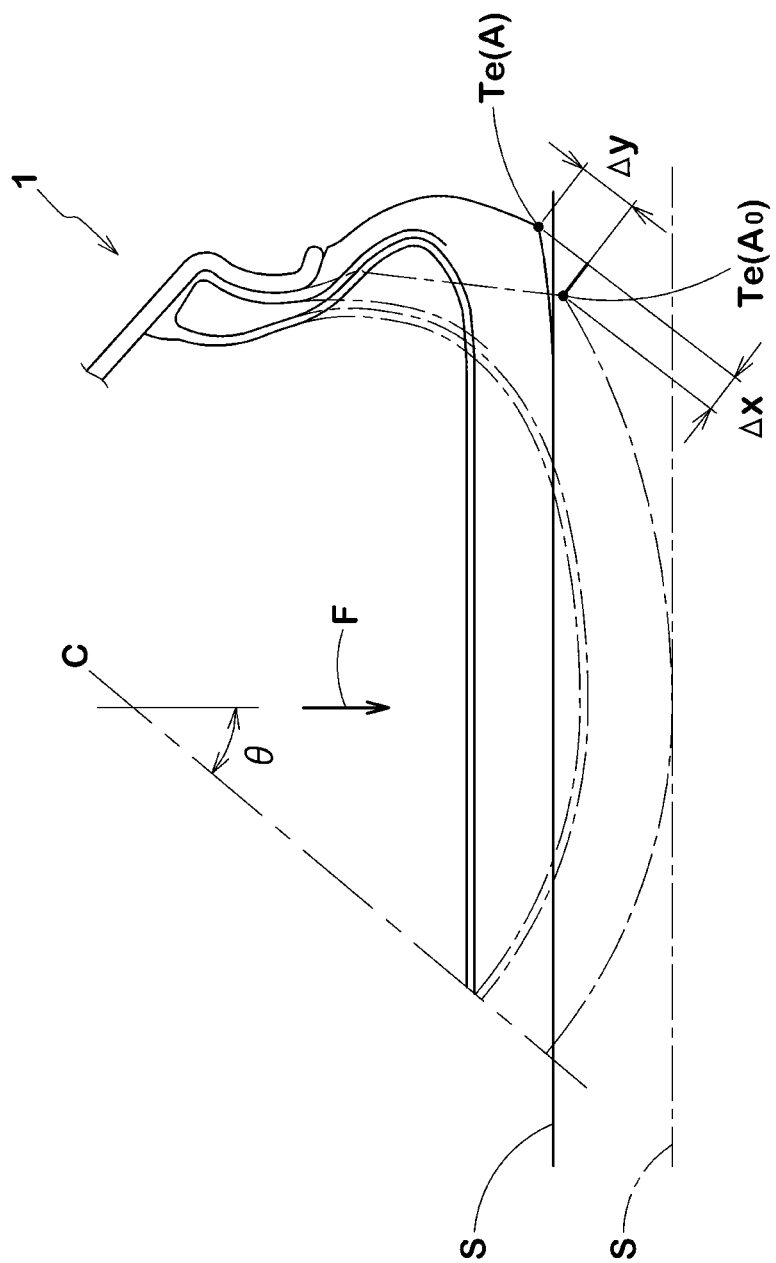
FIG. 3 is a cross-sectional view of the tyre when it is in contact with a flat surface with a camber angle of 40 degrees.

Furthermore, as shown in FIG. 3, when the tyre 1 in the standard state is in contact with a flat surface (S) under the condition of a camber angle $\theta$ of 40 degrees by being loaded with the load (F) in the vertical direction, that is a direction perpendicular to the flat surface, the tyre 1 has the following characteristics between the load (F) and a position (A) of one of the tread edges (Te).

Specifically, first, the position of the tread edge (Te) when the load (F) is zero (F=0) is taken as a reference position (A0). Then, the position (A) of the tread edge (Te) when the load (F) ($\neq$0) is loaded is represented by the displacements ($\Delta$x) in the tyre axial direction from the reference position (A0) and the displacement ($\Delta$y) in the tyre radial direction from the reference position (A0).

Figure 4:
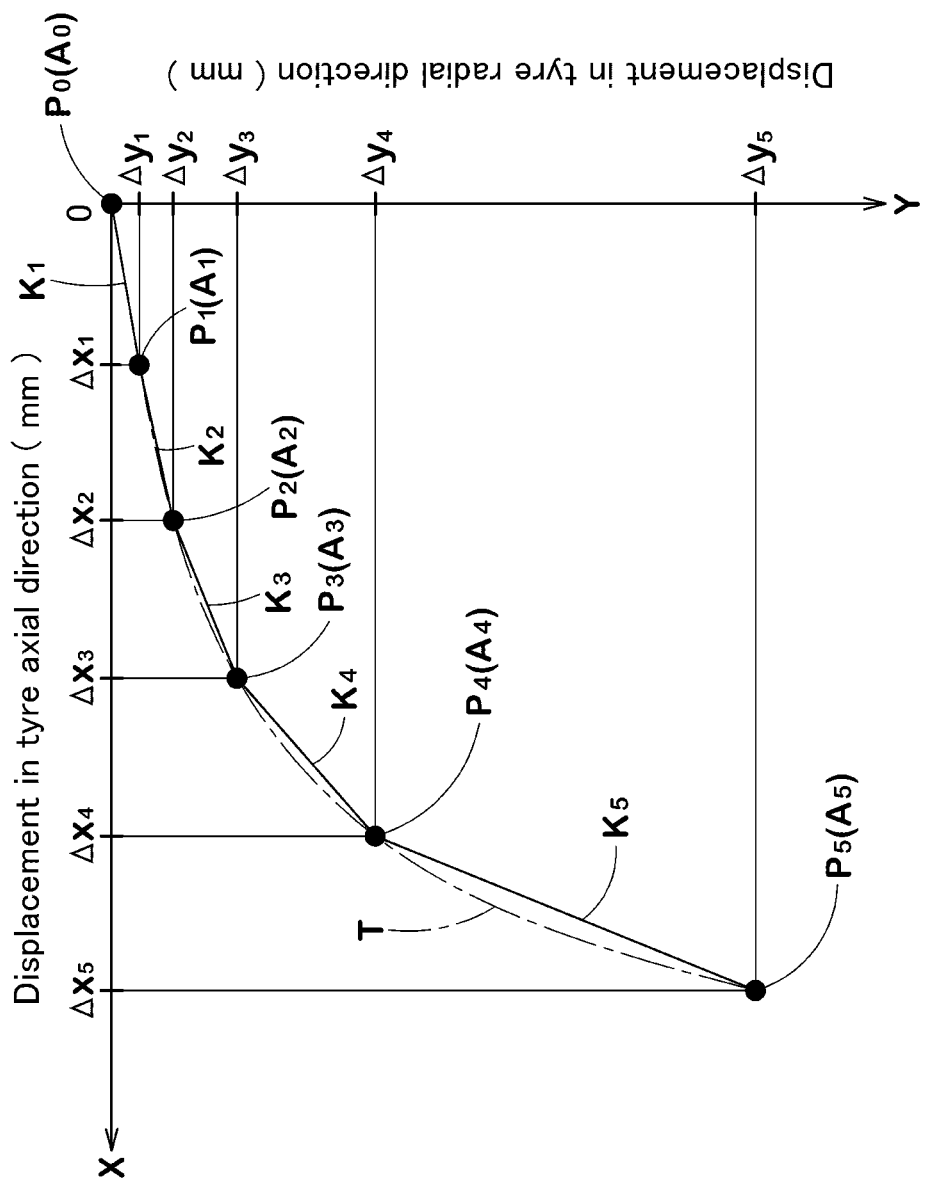
FIG. 4 is a graph showing a curve obtained from points (P)($\Delta$x, $\Delta$y).

As shown in FIG. 4, the present invention is characterized in that the inclination of a curve (T) obtained from points (P)($\Delta$x, $\Delta$y) obtained by plotting the displacements ($\Delta$x) and ($\Delta$y) in the XY coordinates increases as the load (F) increases at least in the range where the load (F) is not more than 78% of the maximum load capacity load. The inclination of the curve (T) is defined as the inclination of a tangent of the curve (T). Further, as a method of obtaining the curve (T) from the point (P), although it is not particularly limited, various methods such as connecting each of the points (P) with a smooth curve and regression analysis of the data of each of the points (P) can be used.

In the tyre configured as such, the rate of increase in the deflection amount of the tread portion 2 in the tyre radial direction increases as the load (F) increases. That is, as the load (F) increases, the rate of increase in the ground contacting width at the time of contacting the ground can be increased. Thereby, it is possible that the occurrence of the sliding especially due to a sudden change of the load during cornering is suppressed, therefore, it is possible that the controllability is improved.

In FIG. 4, the reference position (A0) when the load (F) is 0% of the maximum load capacity load is indicated as a point (P0)(0, 0) on the XY coordinate;

a position (A1) when a load (F1) of 25% of the maximum load capacity load is applied is indicated as a point (P1)($\Delta x1$, $\Delta y1$);

a position (A2) when a load (F2) of 40% of the maximum load capacity load is applied is indicated as a point (P2)($\Delta x2$, $\Delta y2$);

a position (A3) when a load (F3) of 50% of the maximum load capacity load is applied is indicated as a point (P3)($\Delta x3$, $\Delta y3$);

a position (A4) when a load (F4) of 65% of the maximum load capacity load is applied is indicated as a point (P4)($\Delta x4$, $\Delta y4$); and a position (A5) when a load (F5) of 78% of the maximum load capacity load is applied is indicated as a point (P5)($\Delta x5$, $\Delta y5$).

At this time, it is preferred that an inclination (K1) of a straight line connecting between the points (P1) and (P0) calculated as ($\Delta y1-\Delta y0$)/($\Delta x1-\Delta x0$), an inclination (K2) of a straight line connecting between the points (P2) and (P1) calculated as ($\Delta y2-\Delta y1$)/($\Delta x2-\Delta x1$), an inclination (K3) of a straight line connecting between the points (P3) and (P2) calculated as ($\Delta y3-\Delta y2$)/($\Delta x3-\Delta x2$), an inclination (K4) of a straight line connecting between the points (P4) and (P3) calculated as ($\Delta y4-\Delta y3$)/($\Delta x4-\Delta x2$), and an inclination (K5) of a straight line connecting between the points (P5) and (P4) calculated as ($\Delta y5-\Delta y4$)/($\Delta x5-\Delta x3$) satisfy the following expression (1):

$$K1<K2<K3<K4<K5 \qquad (1).$$

In a motorcycle in which the tyre configured as such is mounted on the rear wheel thereof, it becomes easy for the tyre on the rear wheel to bend outwardly in a cornering direction at the early stage of cornering in which the load (F) is relatively small. Thereby, it becomes easy to direct the vehicle body in the cornering direction. This is because the ratio of the displacement ($\Delta x$) in the tyre axial direction increases as the load (F) decreases in a low load region because K1<K2<K3, therefore, it becomes easy to turn the vehicle body in the cornering direction.

Further, in the late stage of cornering in which the load (F) becomes large, the tyre mounted on the rear wheel bends greatly not only in the tyre axial direction but also in the tyre radial direction. Thereby, the ground contacting width is increased, therefore, it is possible that the occurrence of the sliding is suppressed, thereby, it is possible that the cornering performance is improved. This is because K4<K5, therefore, in a high load region of actual use, the ground contacting width continues to increase as the load (F) increases. Thereby, it is possible that the occurrence of the sliding is suppressed even upon a sudden change in the load.

In particular, it is more preferred that the inclination (K5) satisfies the following expression (2):

$$2\times K4<K5<100 \qquad (2).$$

If the inclination (K5) is within the range of the expression (2), the deflection in the tyre radial direction becomes larger in the high load region of actual use. Thereby, it is possible that the occurrence of the sliding is further suppressed upon a sudden change in the load, therefore, the controllability is improved.

Figure 2:
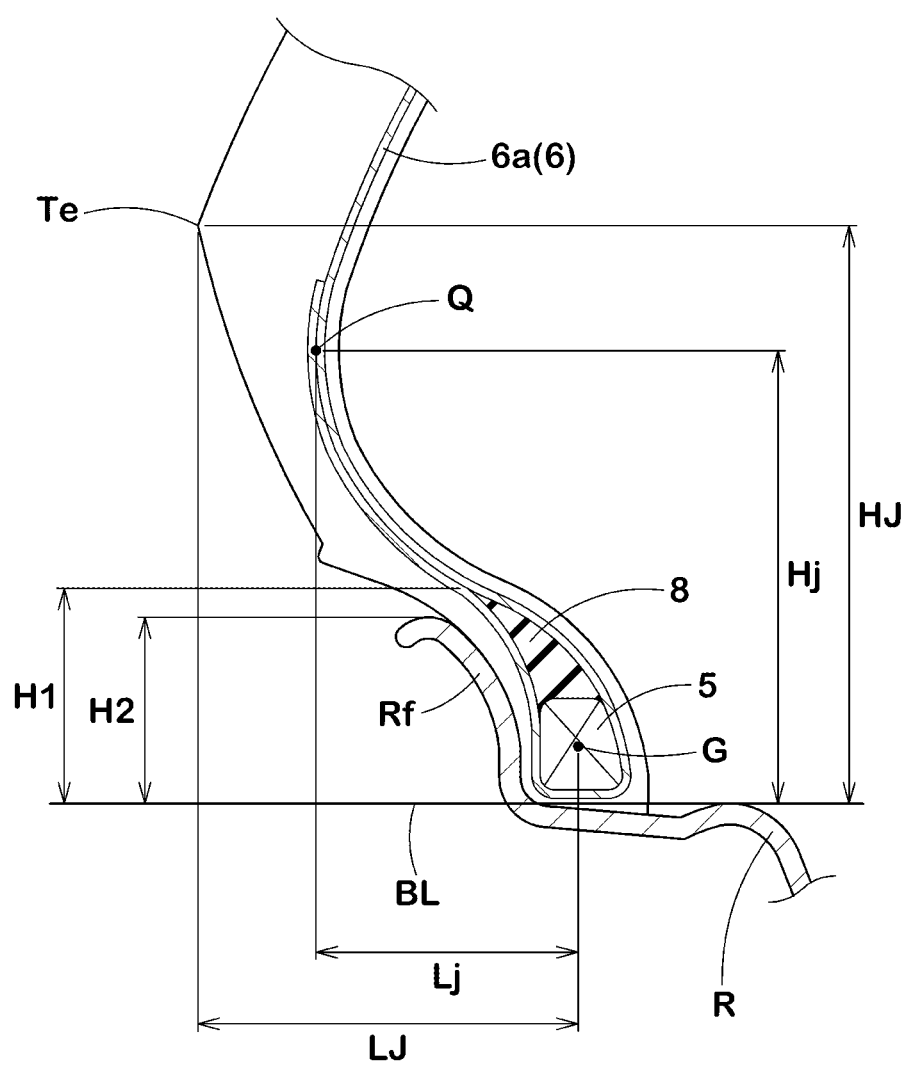
FIG. 2 is an enlarged cross-sectional view of one of bead portions.

Next, in order that the tyre 1 has the characteristics described above, as shown in FIG. 2, it is preferred that a height (H1) in the tyre radial direction of each of the bead apex rubbers 8 from a bead base line BL is in the range of from 0.70 to 1.40 times a height (H2) in the tyre radial direction of a rim flange (Rf) of the standard rim (R) from the bead base line (BL).

If the height (H1) of the bead apex rubber 8 is more than 1.40 times the height (H2) of the rim flange (Rf), the range in which the tyre 1 can deflect in the tyre radial direction becomes narrow. Thereby, it becomes difficult to sufficiently obtain the displacement ($\Delta y$) in the tyre radial direction, particularly in the high load region. Conversely, if the height (H1) is less than 0.7 times the height (H2) of the rim flange (Rf), the tyre gets twisted due to decrease of the lateral rigidity, therefore, cornering characteristics tend to deteriorate. From such a point of view, it is preferred that the lower limit of the height (H1) is not less than 0.9 times the height (H2), and that the upper limit of the height (H1) is not more than 1.30 times the height (H2).

Further, it is preferred that a distance (Lj) in the tyre axial direction between each of maximum width positions (Q) of the carcass 6 and a center of gravity point (G) of a respective one of the bead cores 5 is in the range of from 0.50 to 0.85 times a distance (LJ) in the tyre axial direction between each of the tread edges (Te) and the respective center of gravity point (G). The maximum width positions (Q) are defined as outermost positions in the tyre axial direction of the ply main body portion (6a) of the carcass 6 in the standard state.

If the distance (Lj) in the tyre axial direction of each of the maximum width positions (Q) is less than 0.50 times the distance (LJ) in the tyre axial direction of each of the tread edges (Te), when the load (F) is loaded, it interferes with the rim flange (Rf), therefore, the range in which the tyre 1 can deflect in the tyre radial direction becomes narrow. Thereby, it is impossible to sufficiently obtain the displacement ($\Delta y$) in the tyre radial direction, particularly in the high load region. Conversely, if the distance (Lj) is more than 0.85 times the distance (LJ), the rubber becomes thin, therefore, the lateral rigidity is decreased, thereby, the cornering characteristics tend to deteriorate. From such a point of view, it is preferred that the lower limit of the distance (Lj) is not less than 0.65 times the distance (LJ) and it is preferred that the upper limit of the distance (Lj) is not more than 0.80 times the distance (LJ).

It is preferred that a height (Hj) in the tyre radial direction of the carcass 6 between each of the maximum width positions (Q) and the bead base line (BL) is in the range of from 0.50 to 0.85 times a height (HJ) in the tyre radial direction between each of the tread edges (Te) and the bead base line (BL).

If the height (Hj) in the tyre radial direction of each of the maximum width positions (Q) is more than 0.85 times the height (HJ) in the tyre radial direction of each of the tread edges (Te), when the load (F) is applied, the positions of inflection points of the carcass 6 which are the maximum width positions (Q) become high. Thereby, the range in which the tyre can bend in the tyre radial direction becomes narrow, therefore, conversely the range in which the tyre 1 can bend in the tyre axial direction becomes wide. Thereby, the displacement ($\Delta y$) in the tyre radial direction cannot be sufficiently obtained particularly in the high load region. Conversely, if the height (Hj) is less than 0.50 times the height (HJ), the range in which the tyre can bend in the tyre axial direction becomes narrow, therefore, the cornering characteristics tend to deteriorate. From such a point of view, it is preferred that the lower limit of the height (Hj) is not less than 0.70 times the height (HJ), and that the upper limit of the height (Hj) is not more than 0.80 times the height (HJ).

Further, if a width of the band layer 7 is wide, the range in which the tread portion 2 can bend in the tyre radial direction becomes narrow, therefore, it becomes impossible to sufficiently obtain the displacement ($\Delta y$) in the tyre radial direction particularly in the high load region. On the other hand, if the width of the band layer 7 is narrow, suppression of the lifting of the tread portion 2 becomes insufficient, therefore, the high-speed running performance and the high-speed durability are deteriorated. Thereby, as shown in FIG. 1, it is preferred that a width (Wb) in the tyre axial direction of the band layer 7 is in the range of from 0.5 to 0.95 times the tread width (TW) because it is easy for the band layer to bend in the tyre radial direction, for example. In particular, it is more preferred that the lower limit of the width (Wb) is not less than 0.7 times the tread width (TW) and that the upper limit of the width (Wb) is not more than 0.90 times the tread width (TW).

While detailed description has been made of the tyre as an especially preferred embodiment of the present invention, the present invention can be embodied in various forms without being limited to the illustrated embodiment.

Working Examples (Examples)

Figure 5:
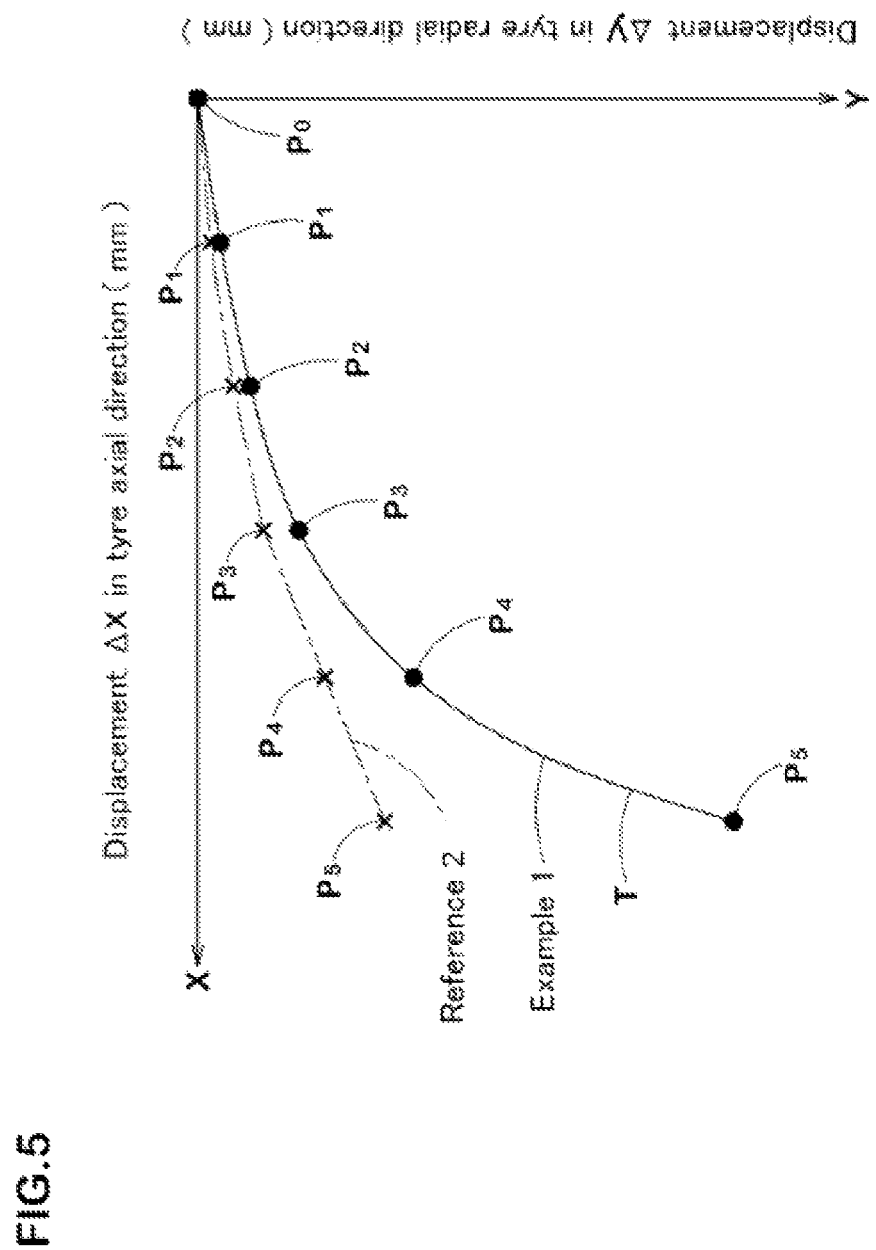
FIG. 5 is a graph showing curves obtained from the points (P)($\Delta$x, $\Delta$y) of Example 1 and Reference 2 of Table 1.

Tyres for a motorcycle (size: 200/60R17, LI (load index): 80) having the structure shown in FIG. 1 were made by way of test according to the specifications listed in Tables 1 and 2. Then, each of the test tyres was brought into contact with a flat surface under the condition of the camber angle of 40 degrees and the load (F) was changed to 0%, 25%, 40%, 50%, 65%, and 78% of the maximum load capacity load, and the position (A) of one of the tread edges closer to the flat surface was plotted on the XY coordinate for each value of the load (F) as points (P1), (P2), (P3), (P4), and (P5), respectively. FIG. 5 is a graph obtained by plotting the points (P1) to (P5) of Example 1 and the points (P1) to (P5) of Reference 2.

In the Examples, as represented by the Example 1, the inclination of the curve (T) obtained from the points (P1) to (P5) increases as the load (F) increases. In contrast, in the References, as represented by the Reference 2, the inclination of the curve (T) obtained from the points (P1) to (P5) does not increase as the load (F) increases, and in particular, the inclination of the curve (T) is constant between the points (P3) and (P5).

Each of the test tyres was tested for the cornering performance and vibration absorbing performance, and then the results were compared with each other. The test methods were as follows.

<Cornering Performance and Vibration Absorbing Performance>

Each of the test tyres was mounted on a rim (17M/C×MT6.00) of a rear wheel of a motorcycle (displacement of 1000 cc) under the condition of the inner pressure of 200 kPa, and the motorcycle was driven on a dry asphalt road surface of a circuit test course.

During the test drive, each of the cornering performance (the controllability) and the vibration absorbing performance was evaluated by the rider's feeling by a five point method, wherein a larger numerical value is better.

Note that on the front wheel, a commercially available tyre (size: 120/70R17) was mounted on a rim (17H/C×MT3.50) under the condition of the inner pressure of 250 kPa.

TABLE 1

|  | Ex. 1 | Ref. 2 |
| --- | --- | --- |
| Inclination of Curve (T) obtained from Points (P1) to (P5) | increasing as Load increases | including a portion of constant inclination |
| Inclination (K1) between Points (P1) and (P0) | 1.2 | 0.76 |
| Inclination (K2) between Points (P2) and (P1) | 1.6 | 1.2 |
| Inclination (K3) between Points (P3) arid (P2) | 2.8 | 1.6 |
| Inclination (K4) between Points (P4) and (P3) | 6.3 | 3.3 |
| Inclination (K5) between Points (P5) and (P4) | 17.3 | 3.3 |
| Height (H1) of Bead apex rubber (*1) | 1.0 × H2 | 1.6 × H2 |
| Height (Hj) of Maximum width position of Carcass (*2) | 0.75 × HJ | 0.90 × HJ |
| Distance (Lj) of Maximum width position of Carcass (*3) | 0.72 × LJ | 0.60 × LJ |
| Width (Wb) of Band layer (*4) | 0.8 × TW | 0.8 × TW |
| Cornering performance | 5 | 2.5 |
| Vibration absorbing performance | 5 | 2.5 |

(*1) H2 is height in tyre radial direction of Rim flange from Bead base line.
(*2) HJ is height in tyre radial direction between Tread edge and Bead base line.
(*3) LJ is distance in tyre axial direction between Tread edge and Center of gravity point (G) of Bead core.
(*4) TW is Tread width.

TABLE 2

| | Ex.1 | Ex.2 | Ex.3 | Ex.4 | Ex.5 | Ex.6 | Ref.2 |
|---|---|---|---|---|---|---|---|
| Inclination of Curve (T) obtained from Points (P1) to (P5) | | | increasing as Load increases | | | | including a portion of constant inclination |
| Height (H1) of Bead apex rubber (*1) | 1.0 × H2 | 1.4 × H2 | 1.0 × H2 | 0.8 × H2 | 0.7 × H2 | 1.0 × H2 | 1.6 × H2 |
| Height (Hj) of Maximum width position of Carcass (*2) | 0.75 × HJ | 0.75 × HJ | 0.85 × HJ | 0.50 × HJ | 0.75 × HJ | 0.75 × HJ | 0.90 × HJ |
| Distance (Lj) of Maximum width position of Carcass (*3) | 0.72 × LJ | 0.72 × LJ | 0.60 × LJ | 0.72 × LJ | 0.85 × LJ | 0.50 × LJ | 0.60 × LJ |
| Width (Wb) of Band layer (*4) | 0.8 × TW | 0.8 × TW | 0.8 × TW | 0.8 × TW | 0.8 × TW | 0.8 × TW | 0.8 × TW |
| Cornering performance | 5 | 4 | 3.5 | 3.5 | 3.5 | 4 | 2.5 |
| Vibration absorbing performance | 5 | 4 | 3.5 | 4 | 4.5 | 3.5 | 2.5 |

(*1) H2 is height in tyre radial direction of Rim flange from Bead base line.
(*2) HJ is height in tyre radial direction between Tread edge and Bead base line.
(*3) LJ is distance in tyre axial direction between Tread edge and Center of gravity point (G) of Bead core.
(*4) TW is Tread width.

As shown in Tables 1 and 2, it can be confirmed that the tyres as the Examples were excellent in the cornering performance.

The invention claimed is:

1. A tyre for a motorcycle comprising a carcass extending between bead cores of bead portions via a tread portion and sidewall portions, wherein when (I) the tyre mounted on a standard rim and inflated to a standard inner pressure is in contact with a flat surface with a camber angle of 40 degrees, (II) a load (F) applied to the tyre is increased from zero, and (III) a curve is obtained by plotting a displacement ($\Delta x$) in a tyre axial direction and a displacement ($\Delta y$) in a tyre radial direction of a position of one of tyre tread edges closer to the flat surface, the displacements being from a reference position when the load (F) is zero, inclination of the curve increases as the load (F) increases at least in a range where the load (F) is not more than 78% of a maximum load capacity load of the tyre, each of the bead portions is provided with a bead apex rubber extending in the tyre radial direction from a respective one of the bead cores, a height (H1) in the tyre radial direction of each of the bead apex rubbers from a bead base line is in a range of from 0.70 to 1.40 times a height (H2) in the tyre radial direction of a rim flange of the standard rim from the bead base line, a distance (Lj) in the tyre axial direction between each of maximum width positions (Q) of the carcass and a center of gravity point (G) of a respective one of the bead cores is in the range of from 0.65 to 0.80 times a distance (LJ) in the tyre axial direction between each of the tread edges (Te) and the respective center of gravity point (G), a height (Hj) in the tyre radial direction of the carcass between each of the maximum width positions (Q) and the bead base line is in a range of from 0.50 to 0.85 times a height (HJ) in the tyre radial direction between each of the tread edges and the bead base line, a band layer formed of a band cord spirally wound is arranged on an outer side in the tyre radial direction of the carcass and inside of the tread portion, a width (Wb) in the tyre axial direction of the band layer is in a range of from 0.5 to 0.95 times a tread width (TW), the carcass consists of a single carcass ply, the carcass ply has a ply main body portion and ply turned up portions, the ply turned up portions terminate between the maximum width positions (Q) and the tread edges in the tyre radial direction, and the ply turned up portions each terminate between a respective axially outer end of the band layer and a respective one of the tread edges in the tyre axial direction.

2. The tyre for a motorcycle according to claim 1, wherein when points obtained by plotting the displacements when the load (F) is 0%, 25%, 40%, 50%, 65%, and 78% of the maximum load capacity load are respectively defined as P0, P1, P2, P3, P4, and P5, an inclination K1 of a straight line connecting between the points P1 and P0 calculated as $(\Delta y1-\Delta y0)/(\Delta x1-\Delta x0)$, an inclination K2 of a straight line connecting between the points P2 and P1 calculated as $(\Delta y2-\Delta y1)/(\Delta x2-\Delta x1)$, an inclination K3 of a straight line connecting between the points P3 and P2 calculated as $(\Delta y3-\Delta y2)/(\Delta x3-\Delta x2)$, an inclination K4 of a straight line connecting between the points P4 and P3 calculated as $(\Delta y4-\Delta y3)/(\Delta x4-\Delta x2)$, and an inclination K5 of a straight line connecting between the points P5 and P4 calculated as $(\Delta y5-\Delta y4)/(\Delta x5-\Delta x3)$ satisfy a following expression (1):

$$K1<K2<K3<K4<K5 \qquad (1).$$

3. The tyre for a motorcycle according to claim 2, wherein the inclination K5 satisfies a following expression (2):

$$2\times K4<K5<100 \qquad (2).$$

4. The tyre for a motorcycle according to claim 1, wherein the height (Hj) of the carcass is in a range of from 0.70 to 0.80 times the height (HJ) between each of the tread edges and the bead base line.

5. The tyre for a motorcycle according to claim 1, wherein
in the carcass ply, carcass cords are arranged at an angle in a range of from 60 to 90 degrees with respect to a tyre circumferential direction.

6. The tyre for a motorcycle according to claim 5, wherein cords made of an organic fiber including nylon, polyester, rayon, or aromatic polyamide are used for the carcass cords.

7. The tyre for a motorcycle according to claim 1, wherein
the ply main body portion extends between the bead cores and the ply turned up portions are arranged at both ends of the ply main body portion and are each turned up around a respective one of the bead cores from inside to outside in the tyre axial direction, and each of the ply turned up portions terminates radially inside a respective one of the tread edges.

8. The tyre for a motorcycle according to claim 1, wherein
the ply main body portion extends between the bead cores and the ply turned up portions are arranged at both ends of the ply main body portion and each turned up around a respective one of the bead cores from inside to outside in the tyre axial direction, and in each of the bead portions, the bead apex rubber extends in a tapered manner and outwardly in the tyre radial direction from the bead core passing through between the ply main body portion and one of the ply turned up portions.

9. The tyre for a motorcycle according to claim 1, wherein
the bead apex rubber is formed of rubber having a rubber hardness not less than 60.

10. The tyre for a motorcycle according to claim 1, wherein
cords made of an organic fiber including nylon, polyester, rayon, or aromatic polyamide or steel cords are used for the band cord.

11. The tyre for a motorcycle according to claim 1, wherein
the height (H1) is not less than 0.9 times the height (H2).

12. The tyre for a motorcycle according to claim 1, wherein
the height (H1) is not more than 1.30 times the height (H2).

13. The tyre for a motorcycle according to claim 1, wherein
the width (Wb) is not less than 0.7 times the tread width (TW).

14. The tyre for a motorcycle according to claim 1, wherein
the width (Wb) is not more than 0.90 times the tread width (TW).

15. The tyre for a motorcycle according to claim 1, wherein
a profile of each of the sidewall portions extends convex axially outward from a respective one of the tread edges.

* * * * *